UNITED STATES PATENT OFFICE.

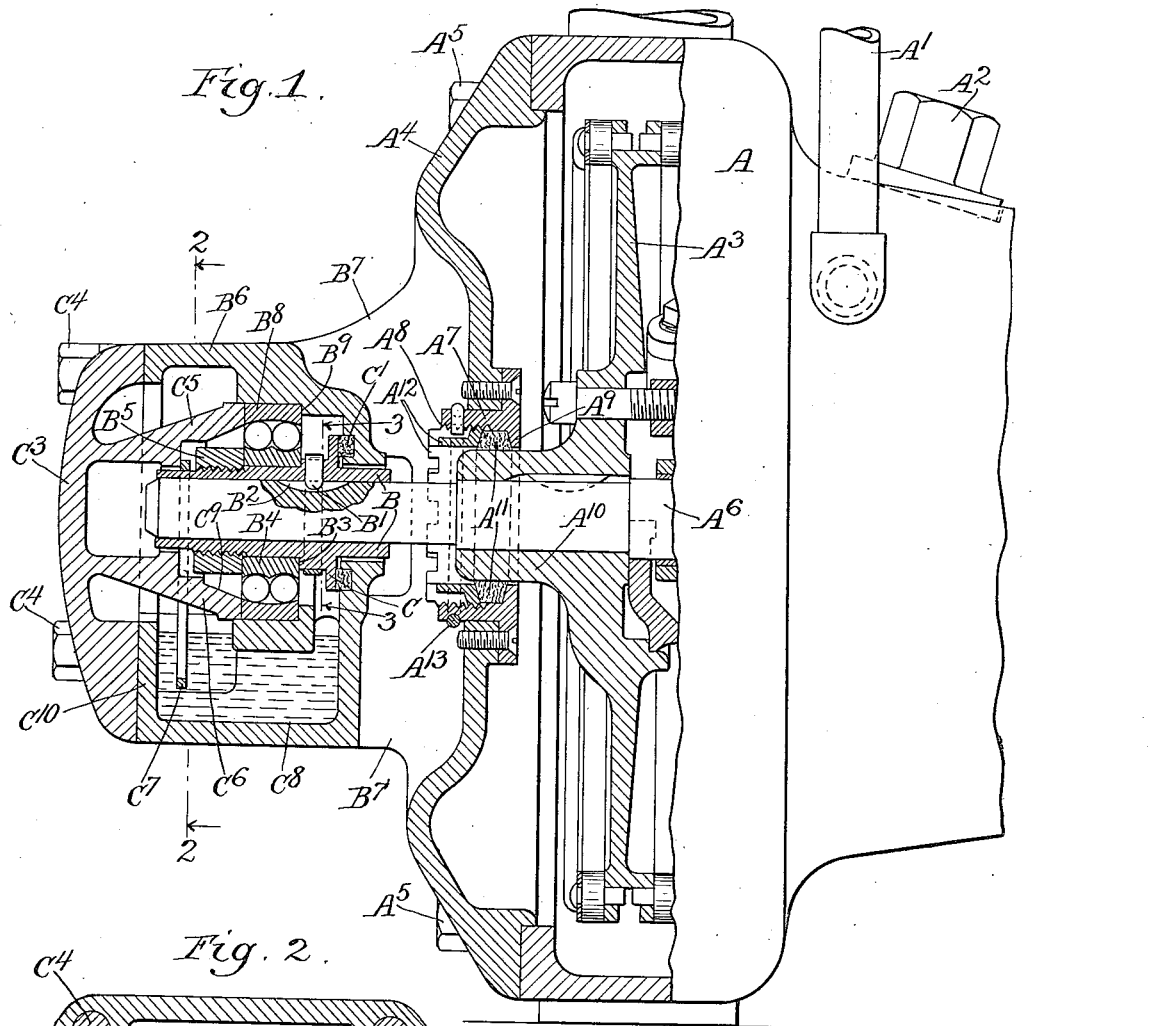
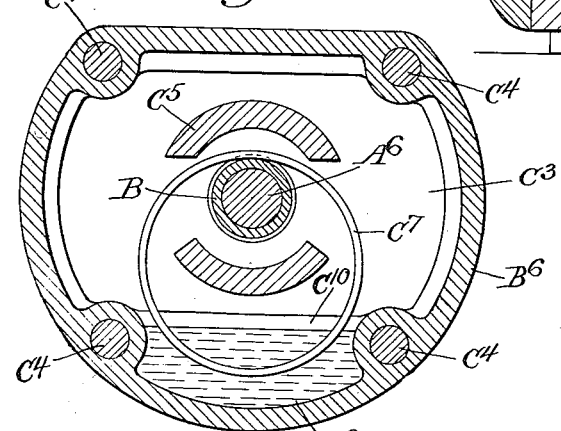
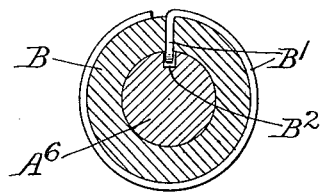

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY.

BEARING FOR STEAM TURBINES.

1,421,918.   Specification of Letters Patent.   Patented July 4, 1922.

Application filed March 3, 1919. Serial No. 280,364.

*To all whom it may concern:*

Be it known that I, CHARLES W. DAKE, a citizen of the United States, residing at Chicago, in the county of Cook and State of Illinois, have invented a certain new and useful Improvement in Bearings for Steam Turbines, of which the following is a specification.

My invention relates to improvements in bearings for steam turbines and has for one object to provide a new and improved form of bearing particularly with relation to those parts associated with and adapted to protect and oil and adjust and position the ball bearing.

Another object is to provide a new and improved form of adjustment and support for a ball bearing for a shaft.

Other objects will appear from time to time in my specification.

My invention is illustrated more or less diagrammatically in the accompanying drawing wherein—

Figure 1 is a side elevation of a part of the turbine with part in section;

Figure 2 is a section along the line 2—2 of Figure 1;

Figure 3 is a detail section along the line 3—3 of Figure 1.

A is a turbine housing. Steam is adapted to be fed into it through a steam pipe $A^1$ and valve housing $A^2$ to drive the bucket wheel $A^3$. This housing A is preferably continuous on one side as shown and is closed on the other side by a removable diaphragm $A^4$ held in position by bolts $A^5$. $A^6$ is the turbine shaft upon which the rotor or wheel $A^3$ is mounted and with which it rotates. This shaft is supported at the motor end of the machine by bearings not here illustrated. The diaphragm $A^4$ is centrally apertured as indicated and this aperture is closed by a removable collar $A^7$ held in position by screws as indicated. This removable collar is interiorly screw-threaded as at $A^8$ and flanged as at $A^9$. The hub $A^{10}$ of the wheel projects outwardly through the collar just clearing the flange $A^9$. $A^{11}$ is a packing contained within the collar $A^7$ resting against the flange $A^9$ adapted to be compressed by the screw-threaded gland $A^{12}$ so as to make a steam tight joint between the ring $A^7$ and the hub. This gland is screw-threaded in the collar $A^7$ and is serrated as indicated and engaged by holding spring $A^{13}$ which holds it against rotation though, of course, the spring may be drawn out and rings applied for the necessary usual adjustment.

The end of the shaft $A^6$ extends out beyond the diaphragm $A^4$ and is slidably mounted within a sleeve B. This sleeve is held against rotation on the shaft by a spring key $B^1$ projecting in through a perforation in the sleeve to engage a curved key seat $B^2$. The arrangement is such that when the parts are in the position shown in Figure 1, the spring key snaps into the key seat and holds the seat in rotation with respect to the shaft. If you pull the sleeve longitudinally along the shaft, however, the inclined surface of the key seat will cause the spring key as it engages it to ride up until the key has left the key seat and thus the sleeve may be easily withdrawn. The sleeve B is shouldered as at $B^3$ and the inner race $B^4$ of the ball bearing is clamped against the shoulder by the nut $B^5$ on the sleeve B. $B^6$ is a bearing housing supported by arms $B^7$ on the diaphragm $A^4$. This bearing housing is bored out to engage the outer ball race $B^8$ of the shaft supporting ball bearings and is shouldered as at $B^9$ to engage such outer ball race.

The sleeve B is flanged as at C and this flange engages a felt packing $C^1$ in the wall $C^2$ of the bearing housing. A cover $C^3$ removable on the outer end of the bearing housing closes it, being held in position by bolts $C^4$. This cover has two segmental conical partition walls $C^5$ $C^6$ adapted to engage upper and lower sides of the ball race $B^8$ and clamp that ball race in position in the bearing housing. The reason why the members $C^5$ $C^6$ are segmental is to leave room for an oil ring $C^7$ which rides on the outer end of the sleeve B and carries oil up from the oil well $C^8$ in the bearing housing. This oil runs down the inclined surface $C^9$ to oil the ball bearing and a certain amount of oil, of course, works its way in between the sleeve and shaft to oil those parts so that sliding movement may take place when desired. The oil pocket $C^8$ is bounded on its outer side by the wall or dam $C^{10}$ so that when the cover $C^3$ is taken off the oil does not run out of the pocket and the bearing may be adjusted and parts removed or changed , without losing oil. Clearances are such that the oil ring might bounce or jump out of its position and it is held where it belongs and stays there at all times. The only way you can get the oil ring out is by withdrawing the cover C³.

When it is desired to dismount the apparatus, the cover C³ can be drawn out and the bearing may be inspected or drawn off if need be or if the whole assembly is to be taken down you release the gland A¹², unscrew the screws A⁵, and the whole diaphragm and bearing cover could be taken off thus exposing the whole inside of the turbine without in any way changing the adjustment of the ball bearing. Of course, the important thing is to make it possible to take down the machine without changing the adjustment of the ball bearing or without making it necessary to have expensive and expert help do the work.

It will be evident that while I have shown in my drawings an operative device, still many changes might be made both in size, shape and arrangement of parts without departing materially from the spirit of my invention, and I wish, therefore, that my drawings be regarded as in a sense diagrammatic.

I claim:—

1. The combination with a bearing housing having an apertured wall of a sleeve mounted for rotation within the aperture and extending into the housing, a ball bearing surrounding the sleeve anchored in position and supporting the sleeve, a shaft passing inwardly through the aperture in the wall and removably engaging the sleeve, and means for holding the shaft and sleeve against rotation with respect one to another, and said means being adapted to permit ready withdrawal of the shaft longitudinally from the sleeve without changing the relation between sleeve and bearing, the means for holding shaft and sleeve together comprising a spring collar surrounding the sleeve, a spring key penetrating the sleeve mounted on and forced inwardly by the spring collar and a key seat on the shaft adapted to be engaged by the spring key.

2. A housing open on one side, and having an apertured wall in the other, a ball bearing and means for holding it in position in the housing, a sleeve fixed in the ball bearing and supported therein; a cover closing the opened end of the housing, means carried by the cover extending inwardly to engage and secure the bearing, an oil ring mounted for rotation on the sleeve, an oil pocket contained in the lower portion of the housing and means comprising one of the members inwardly extending from the cover, for conducting oil to the ball bearing.

3. A housing open on one side and having an apertured wall on the other, a ball bearing, a cover closing the open end of the housing, and means carried by the cover extending inwardly to engage the ball bearing to hold said bearing in position within said housing, a sleeve fixed in the ball bearing and supported therein.

4. A housing open on one side and having an apertured wall on the other, a ball bearing, a cover closing the open end of the housing, and means carried by the cover extending inwardly to engage the ball bearing to hold said bearing in position within said housing, a sleeve fixed in the ball bearing and supported therein, an oil ring mounted for rotation on the sleeve, an oil pocket contained in the lower portion of the housing and means comprising one of the projections extending inwardly from the cap for conducting oil from the sleeve where said oil is discharged by the ring through the ball bearing.

5. The combination with a shaft of a ball bearing therefor, a sleeve in fixed relation with the ball bearing and yielding means for holding the shaft and sleeve against rotation with respect one to another while permitting lateral withdrawal of the shaft.

6. The combination with a ball bearing and shaft rotatively mounted therein, of a housing containing said bearing, a cover therefor, an oil chamber below said bearing, means for raising said oil, and combined means for conducting the oil to said bearing, and for holding the bearing in place, comprising members inwardly extending from said cover against said bearing.

7. The combination with a shaft of a sleeve mounted thereon, the sleeve and shaft being longitudinally movable with respect one to the other, a ball bearing rigidly mounted on the sleeve, means for holding the shaft and sleeve against rotation with respect one to the other comprising a spring key, means for yieldingly thrusting said key inwardly towards the shaft and a key-way in the shaft adapted to be engaged by said key.

8. The combination with a shaft of a sleeve mounted thereon, the sleeve and shaft being longitudinally movable with respect one to the other, a ball bearing rigidly mounted on the sleeve, means for holding the shaft and sleeve against rotation with respect one to the other comprising a spring key, means for yieldingly thrusting said key inwardly towards the shaft and a key-way in the shaft adapted to be engaged by said key, the key-way having a curved bottom to guide and gradually force the key out of engagement with the shaft as the shaft is moved longitudinally with respect to the key.

9. A turbine cover cap, comprising a cup shaped plate, a depression in one side of said plate, a tubular projection in the depression and extending out of said depression progressively increasing in diameter from the plate outwardly and a slot cut across the end of said projection.

10. A turbine cover cap, comprising a plate, a depression in one side of said plate, a hollow projection in the depression and extending out of said depression progressively increasing in diameter from the plate outwardly and a slot cut across the end of said projection.

11. A turbine cover cap, comprising a plate, a depression in one side of said plate, a curved segmental projection in the depression and extending from said depression, increasing in diameter from the plate outwardly.

12. A turbine cover cap, comprising a cup shaped plate, a depression in one side of said plate, a tubular projection in the depression and extending out of said depression progressively increasing in diameter from the plate outwardly and a slot cut across the end of said projection and a bearing engaging surface at the end of the projection.

13. A turbine cover cap, comprising a plate, a depression in one side of said plate, a hollow projection in the depression and extending out of said depression progressively increasing in diameter from the plate outwardly, a slot cut across the end of said projection and a bearing engaging surface at the end of the projection.

14. A turbine cover cap, comprising a plate, a depression in one side of said plate, a curved segmental projection in the depression and extending from said depression, increasing in diameter from the plate outwardly, and a bearing engaging surface at the end of the projection.

15. A ball bearing sleeve comprising a tube of varying exterior diameter, an exterior bearing surface at one end, a threaded portion adjacent said bearing surface, a second exterior bearing surface of greater diameter than the first and adapted to carry a ball race, a further enlargement adjacent said second exterior surface and a perforation in said enlargement, a radial flange adjacent said enlargement and a portion of reduced diameter adjacent said flange.

16. A removable cover for a bearing housing having a pair of conical segments integral therewith and extending from the cover inwardly into the housing.

17. A cover for a bearing housing having bearing engaging members integral with the cover, extending inwardly therefrom and adapted to engage and seat the bearing.

18. A housing, open on one side, and having an apertured wall on the other, a ball bearing in position therein, a shaft entering the housing through said aperture and supported in said ball bearing, a dam across the lower portion of the open side of the housing, a cover for said open side of the housing and an inward projection therefrom adapted to engage and seat the ball bearing within the housing.

19. A housing, open on one side, and having an apertured wall on the other, a ball bearing in position therein, a shaft entering the housing through said aperture and supported in said ball bearing, a dam across the lower portion of the open side of the housing, a cover for said open side of the housing and a substantially centrally disposed inward projection therefrom adapted to engage and seat the ball bearing within the housing.

20. A housing, open on one side and having an apertured wall on the other, a ball bearing and means for holding said ball bearing in position therein, a shaft entering the housing through said aperture and supported in said ball bearing, a cover for said open side of the housing and a substantially centrally disposed inward projection therefrom adapted to engage and seat the ball bearing within the housing.

In testimony whereof, I affix my signature in the presence of two witnesses this 11th day of February, 1919.

CHARLES W. DAKE.

Witnesses:
EDITH L. PORTEO,
MARION L. INGRAHAM.